(12) United States Patent
Kato

(10) Patent No.: US 11,312,409 B2
(45) Date of Patent: Apr. 26, 2022

(54) STEERING CONTROL DEVICE

(71) Applicant: JTEKT CORPORATION, Osaka (JP)

(72) Inventor: Hisataka Kato, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/951,102

(22) Filed: Nov. 18, 2020

(65) Prior Publication Data

US 2021/0155282 A1 May 27, 2021

(30) Foreign Application Priority Data

Nov. 22, 2019 (JP) .............................. JP2019-211053

(51) Int. Cl.
*B62D 5/04* (2006.01)
*H02P 21/00* (2016.01)

(52) U.S. Cl.
CPC ........... *B62D 5/046* (2013.01); *B62D 5/0463* (2013.01); *B62D 5/0469* (2013.01); *B62D 5/0481* (2013.01); *H02P 21/0089* (2013.01); *H02P 21/0085* (2013.01)

(58) Field of Classification Search
None
See application file for complete search history.

(56) References Cited

U.S. PATENT DOCUMENTS

| | | | | |
|---|---|---|---|---|
| 5,652,495 A * | 7/1997 | Narazaki | ............. | H02P 21/0089 318/716 |
| 6,194,865 B1 * | 2/2001 | Mitsui | ..................... | H02P 21/08 318/811 |
| 7,755,314 B2 * | 7/2010 | Atarashi | ................ | H02K 1/276 318/437 |
| 8,896,244 B2 * | 11/2014 | Kleinau | ..................... | H02P 3/18 318/400.01 |
| 9,663,139 B2 * | 5/2017 | Kleinau | .................. | H02P 21/22 |
| 9,887,663 B2 * | 2/2018 | Kitaori | .................... | B60L 58/12 |
| 10,020,770 B2 * | 7/2018 | Kitaori | .................... | H02P 27/06 |
| 10,715,069 B2 * | 7/2020 | Yamaguchi | ........... | B60L 15/025 |
| 10,797,620 B2 * | 10/2020 | Furukawa | ............... | H02P 21/06 |
| 2009/0001914 A1 * | 1/2009 | Atarashi | ................ | B60K 6/442 318/437 |
| 2009/0234538 A1 * | 9/2009 | Ta | ........................ | H02P 21/0089 701/41 |

(Continued)

FOREIGN PATENT DOCUMENTS

WO 2006/098516 A1 9/2006

*Primary Examiner* — Kevin R Steckbauer
(74) *Attorney, Agent, or Firm* — Oliff PLC

(57) ABSTRACT

A steering control device includes an electronic control unit configured to calculate a d-axis current command value and a q-axis current command value for a motor having three phases configured to generate drive power applied to a shaft interlocked with turning wheels, to convert detected current values in the phases of the motor to a d-axis current value and a q-axis current value, and to perform feedback control. The electronic control unit is configured to perform field weakening control for setting the d-axis current command value to a negative value based on a rotation speed of the motor, to determine whether the motor is in a regenerative state, and to calculate the d-axis current command value according to the regenerative state of the motor when the electronic control unit determines that the motor is in the regenerative state.

6 Claims, 4 Drawing Sheets

(56) References Cited

U.S. PATENT DOCUMENTS

| | | | |
|---|---|---|---|
| 2013/0154524 A1* | 6/2013 | Kleinau | B60L 7/14 |
| | | | 318/376 |
| 2014/0239860 A1* | 8/2014 | Kleinau | H02P 21/22 |
| | | | 318/400.14 |
| 2017/0257055 A1* | 9/2017 | Kitaori | B60L 58/20 |
| 2018/0115272 A1* | 4/2018 | Kitaori | B60L 50/61 |
| 2019/0256129 A1* | 8/2019 | Oka | H02P 21/0003 |
| 2019/0280629 A1* | 9/2019 | Furukawa | H02P 21/06 |
| 2019/0296669 A1* | 9/2019 | Yamaguchi | H02P 29/025 |
| 2020/0317257 A1* | 10/2020 | Ootake | B62D 5/0481 |
| 2020/0353973 A1* | 11/2020 | Nakamura | H02P 27/08 |
| 2021/0155282 A1* | 5/2021 | Kato | B62D 5/0481 |
| 2021/0155285 A1* | 5/2021 | Li | H02P 6/08 |

\* cited by examiner

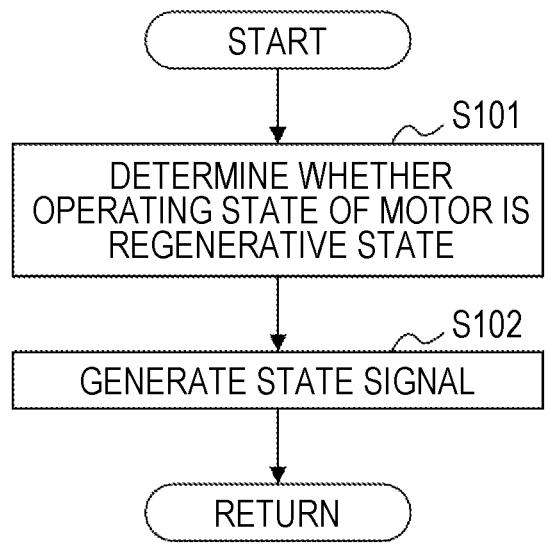
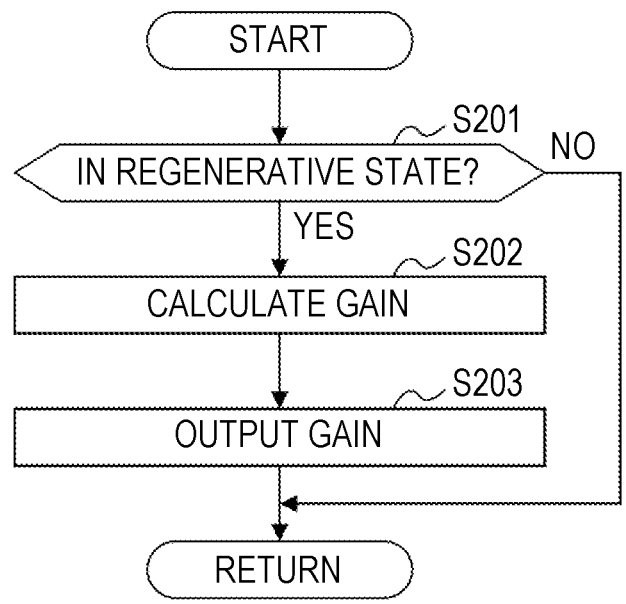

STEERING CONTROL DEVICE

CROSS-REFERENCE TO RELATED APPLICATION

This application claims priority to Japanese Patent Application No. 2019-211053 filed on Nov. 22, 2019, incorporated herein by reference in its entirety.

BACKGROUND

1. Technical Field

The disclosure relates to a steering control device.

2. Description of Related Art

For example, WO 2006/098516 describes an electric power steering system that assists an operation of a steering wheel by applying a torque of a motor as an assist force to a steering shaft. A control device for such an electric power steering system calculates a target assist force based on a steering torque which is detected by a torque sensor and a vehicle speed which is detected by a vehicle speed sensor, and controls supply of electric power to the motor such that the target assist force is applied to the steering shaft.

A three-phase brushless motor is often used as the motor. In this case, the control device controls supply of electric power to the motor by vector control. That is, the control device converts detected values of three-phase current sensors from three phases to two phases in a d-q-axis coordinate system and performs current feedback control in the d-q-axis coordinate system. Since the d-q-axis coordinate system is a rotary coordinate system, a current is divided into a torque component and a field weakening component and current vector control is performed.

In an electric power steering system, for example, when a quick steering operation is performed, rotation of a motor in a high-speed area higher than a base speed thereof may be required. In the high-speed area, an induced voltage is higher than a power source voltage and a so-called voltage-saturated state in which a current cannot flow occurs. In order to prevent this state, field weakening control is generally performed. The field weakening control decreases magnetic flux in a d-axis direction and decreases the induced voltage to a lower value by setting a d-axis current command value in current feedback control to a negative value based on a rotation speed of the motor (that is, a steering speed of steering), that is, by causing a negative d-axis current to flow. By performing such field weakening control, a rotational area (an operation range) of the motor is extended to a high-speed area higher than a base speed and followability at the time of quick steering (i.e., steering at a high speed) is secured.

SUMMARY

In such an electric power steering system, the following events may occur. Specifically, when a large reverse input load is applied to a turning shaft due to a vehicle running onto a curbstone or the like, so-called end contact in which an end of the turning shaft comes into contact with a housing due to movement of the turning shaft in its axis direction may occur. In this case, the motor also rotates in a direction corresponding to the moving direction of the turning shaft in accordance with the movement of the turning shaft.

When a large reverse input load is applied to the turning shaft, the turning shaft moves at a very high speed. Accordingly, the motor also rotates at a high speed in proportion to the moving speed of the turning shaft. As a result, the d-axis current command value increases in a negative direction. Accordingly, an increase in the rotation speed of the motor may be promoted. As a result, there is a concern about a further increase in impact load when the turning shaft comes into contact with the housing.

The disclosure provides a steering control device that can appropriately operate a motor.

A steering control device according to an aspect of the disclosure includes an electronic control unit configured to calculate a d-axis current command value and a q-axis current command value in a d-q coordinate system as current command values for a motor having three phases configured to generate drive power applied to a shaft that is interlocked with turning wheels, to convert detected current values in the phases of the motor to a d-axis current value and a q-axis current value in the d-q coordinate system, and to perform feedback control such that the d-axis current value and the q-axis current value that are obtained by conversion match the d-axis current command value and the q-axis current command value, respectively. The electronic control unit is configured to perform field weakening control for setting the d-axis current command value to a negative value based on a rotation speed of the motor, to determine whether the motor is in a regenerative state, and to calculate the d-axis current command value according to the regenerative state of the motor when the electronic control unit determines that the motor is in the regenerative state.

With this configuration, when the motor is in the regenerative state, the d-axis current command value is calculated based on the regenerative state of the motor. That is, for example, when a reverse input load is applied to the turning wheels, the rotation speed of the motor is adjusted based on the regenerative state of the motor. Accordingly, it is possible to more appropriately operate the motor based on the regenerative state of the motor.

In the steering control device according to the aspect, the electronic control unit may be configured to set an absolute value of the d-axis current command value to a value that is smaller than an original value based on the rotation speed of the motor when the electronic control unit determines that the motor is in the regenerative state.

With this configuration, it is possible to curb an increase in moving speed of turning wheels or a shaft interlocked with the turning wheels by a regenerative braking force resulting from an induced voltage based on the rotation speed of the motor. Accordingly, it is possible to decrease an impact due to a reverse input via the turning wheels.

In the steering control device according to the aspect, the electronic control unit may be configured to set the d-axis current command value to zero when the electronic control unit determines that the motor is in the regenerative state. With this configuration, it is possible to curb an increase in moving speed of turning wheels or a shaft interlocked with the turning wheels by a regenerative braking force resulting from an induced voltage based on the rotation speed of the motor. Accordingly, it is possible to decrease an impact due to a reverse input via the turning wheels.

In the steering control device according to the aspect, the electronic control unit may be configured to set an absolute value of the d-axis current command value such that the absolute value of the d-axis current command value decreases as an amount of electric power generated by the motor increases when the electronic control unit determines that the motor is in the regenerative state.

With this configuration, it is possible to curb an increase in moving speed of turning wheels or a shaft interlocked with the turning wheels by a regenerative braking force resulting from an induced voltage based on the rotation speed of the motor. Accordingly, it is possible to decrease an impact due to a reverse input via the turning wheels.

In the steering control device according to the aspect, the electronic control unit may be configured to gradually change the d-axis current command value when the electronic control unit determines that the motor is in the regenerative state. With this configuration, it is possible to gradually increase an induced voltage of the motor and electric power which is generated by the motor.

In the steering control device according to the aspect, the electronic control unit may be configured to determine the regenerative state of the motor based on a direction of a power source current or a power source voltage. When the motor is in the regenerative state, electric power generated by the motor flows to an electric power source. Accordingly, it is possible to determine whether the motor is in the regenerative state based on the direction of the power source current. When the motor is in the regenerative state, the power source voltage increases due to the induced voltage of the motor. Accordingly, it is possible to determine the regenerative state of the motor based on the power source voltage.

With the steering control device according to the aspect of the disclosure, it is possible to more appropriately operate the motor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart illustrating a process routine which is performed by a regeneration determining unit according to the first embodiment;

FIG. 4 is a flowchart illustrating a process routine which is performed by a regeneration determining unit according to a second embodiment.

DETAILED DESCRIPTION OF EMBODIMENTS

First Embodiment

Hereinafter, a first embodiment in which a steering control device is embodied as a control device for an electric power steering system will be described.

Figure 1:
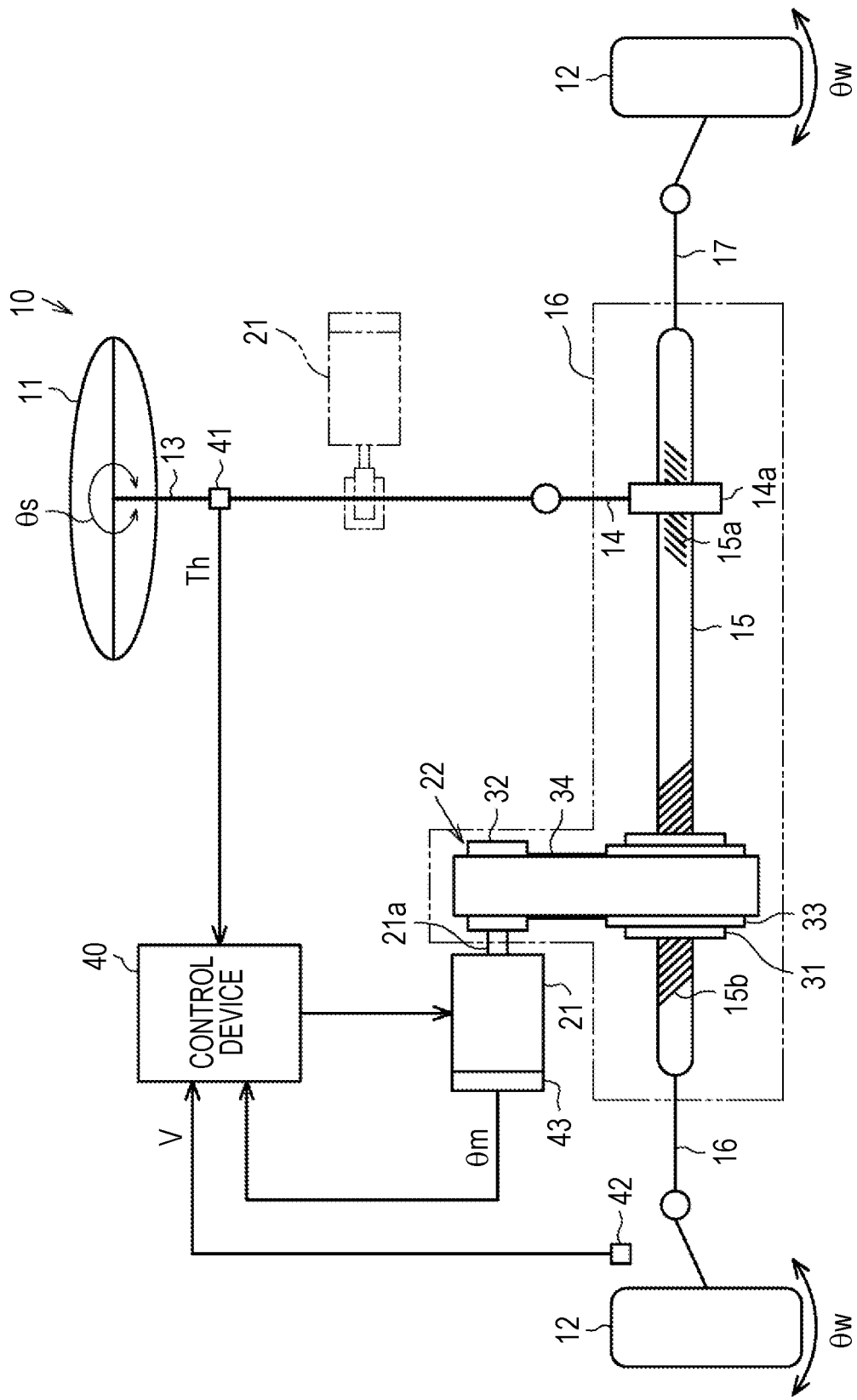
FIG. 1 is a diagram schematically illustrating a configuration of an electric power steering system in which a steering control device according to a first embodiment is mounted.

As illustrated in FIG. 1, an electric power steering system 10 includes a steering shaft 13 that functions as a power transmission path between a steering wheel 11 and turning wheels 12 and 12, a pinion shaft 14, and a turning shaft 15. The turning shaft 15 extends in a width direction of a vehicle body (the right-left direction in FIG. 1). The turning shaft 15 is accommodated in a housing 16 that is fixed to a vehicle body. Turning wheels 12 and 12 are respectively connected to both ends of the turning shaft 15 with tie rods 17 and 17 interposed therebetween. Pinion teeth 14a of the pinion shaft 14 engage with rack teeth 15a of the turning shaft 15. Accordingly, when the turning shaft 15 moves in its axis direction in accordance with a rotating operation of the steering wheel 11, turning angles θw and θw of the turning wheels 12 and 12 are changed.

The electric power steering system 10 includes a motor 21 and a transmission mechanism 22 as constituent elements configured to apply, to the turning shaft 15, an assist force for assisting an operation of the steering wheel 11.

The motor 21 is a source of generation of an assist force, and a three-phase brushless motor is employed. The motor 21 is fixed to a part outside of the housing 16. An output shaft 21a of the motor 21 extends in parallel with the turning shaft 15. The output shaft 21a of the motor 21 is connected to the turning shaft 15 via the transmission mechanism 22. A torque generated by the motor 21 is applied as an assist force to the turning shaft 15 via the transmission mechanism 22.

The transmission mechanism 22 includes a ball nut 31, a driving pulley 32, a driven pulley 33, and an endless belt 34. The ball nut 31 is screwed to a ball screw portion 15b of the turning shaft 15 with a plurality of balls (not illustrated) interposed therebetween. The driving pulley 32 is fixed to the output shaft 21a of the motor 21. The driven pulley 33 is fixed in a state in which the driven pulley 33 is fitted to the outer peripheral surface of the ball nut 31. The belt 34 spans between the driving pulley 32 and the driven pulley 33. Accordingly, rotation of the motor 21 is transmitted to the ball nut 31 via the driving pulley 32, the belt 34, and the driven pulley 33. With rotation of the ball nut 31, the turning shaft 15 moves in its axis direction.

The electric power steering system 10 includes a control device 40 that controls the motor 21. The control device 40 acquires results of detection performed by various kinds of sensors mounted in the vehicle as information indicating a driver's request or a traveling state, and controls the motor 21 on the basis of the acquired information. Examples of the sensors include a torque sensor 41, a vehicle speed sensor 42, and a rotation angle sensor 43. The torque sensor 41 is provided in the steering shaft 13 and detects a steering torque Th which is applied to the steering shaft 13. The vehicle speed sensor 42 detects a vehicle speed V. The rotation angle sensor 43 is provided in the motor 21 and detects a rotation angle θm of the motor 21. The control device 40 performs assist control for generating an assist force based on the steering torque Th and the vehicle speed V by performing power supply control for the motor 21. The control device 40 performs vector control for the motor 21 using the rotation angle θm of the motor 21 detected by the rotation angle sensor 43.

Figure 2:
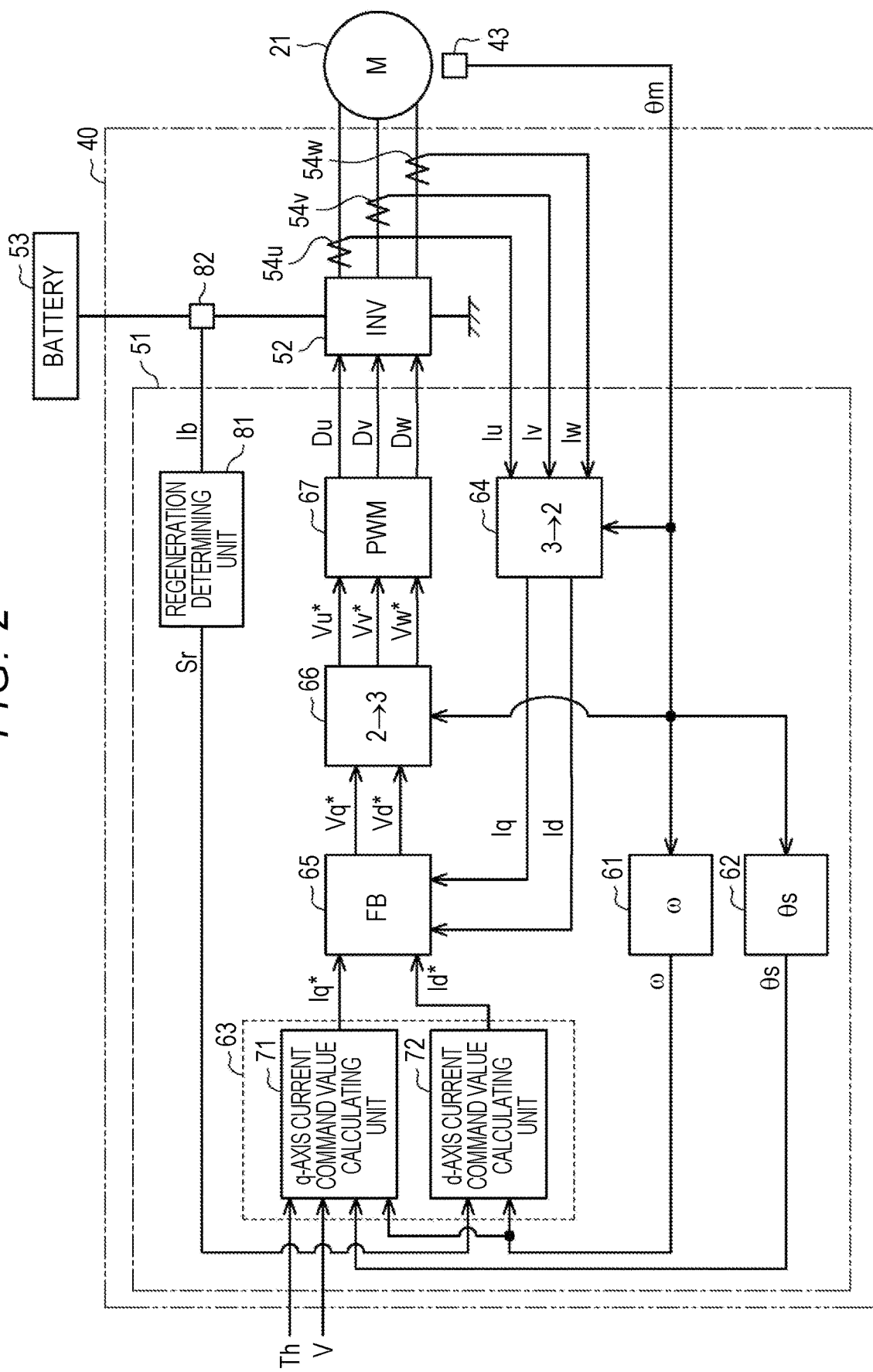
FIG. 2 is a block diagram illustrating the steering control device according to the first embodiment.

The control device 40 will be described below in detail. As illustrated in FIG. 2, the control device 40 includes a microcomputer 51 that generates a motor control signal and a motor drive circuit 52 that supplies three-phase driving electric power to the motor 21 based on the motor control signal generated by the microcomputer 51. In other words, the control device 40 includes an electronic control unit including a central processing unit (CPU).

The motor drive circuit 52 is a known PWM inverter and has a configuration in which three arms corresponding to three phases are connected in parallel. Switching elements, such as a pair of field effect transistors (FETs) connected in series, serve as each arm that is a basic unit. The motor control signal generated by the microcomputer 51 determines a duty ratio (i.e., a duty cycle) of each switching element of the motor drive circuit 52. The motor control signal is applied to the gate terminal of each switching element. When each switching element is turned on and off in response to the motor control signal, a direct-current voltage of the battery 53 which is mounted in the vehicle is converted to driving electric power in three phases (U, V, and W) and is supplied to the motor 21.

The microcomputer 51 receives the steering torque Tb detected by the torque sensor 41, the vehicle speed V detected by the vehicle speed sensor 42, and the rotation angle θm of the motor 21 detected by the rotation angle sensor 43. The microcomputer 51 receives values of phase currents Iu, Iv, and Tw in three phases detected by current sensors 54u, 54v, and 54w which are provided in a power supply path to the motor 21. The microcomputer 51 controls supply of electric power to the motor 21 such that an appropriate assist force based on the operating state of the steering wheel 11 or the traveling state of the vehicle is acquired based on the steering torque Th, the vehicle speed V, the rotation angle θm of the motor 21, and the values of the currents Iu, Iv, and Iw of the motor 21 which are detected by the sensors. The control device 40 controls the motor 21 by vector control which is described in a d-q coordinate system which is a two-phase rotary coordinate system.

The configuration of the microcomputer 51 will be described below in detail. As illustrated in FIG. 2, the microcomputer 51 includes a rotation speed calculating unit 61, a steering angle calculating unit 62, a current command value calculating unit 63, a three-phase/two-phase coordinate conversion unit 64, a feedback control unit 65, a two-phase/three-phase coordinate conversion unit 66, and a control signal generating unit 67.

The rotation speed calculating unit 61 is a differentiator and calculates a rotation speed to of the motor 21 by differentiating the rotation angle θm of the motor 21 detected by the rotation angle sensor 43 with respect to time. The steering angle calculating unit 62 calculates a steering angle θs which is a rotation angle of the steering wheel 11 based on the rotation angle θm of the motor 21 detected by the rotation angle sensor 43. The steering angle calculating unit 62 calculates a rotation angle θm of multi-rotation exceeding 360° as an absolute value, for example, by counting the number of rotations of the motor 21 with respect to a neutral position of the steering wheel 11 corresponding to a forward travel state of the vehicle. The steering angle calculating unit 62 calculates the steering angle θs by multiplying the rotation angle θm of multi-rotation of the motor 21 by a conversion factor based on a reduction gear ratio from the motor 21 to the steering shaft 13.

The current command value calculating unit 63 includes a q-axis current command value calculating unit 71 and a d-axis current command value calculating unit 72. The q-axis current command value calculating unit 71 calculates a basic assist torque based on the steering torque Th detected by the torque sensor 41 and the vehicle speed V detected by the vehicle speed sensor 42. The q-axis current command value calculating unit 71 calculates a target assist torque such that an absolute value thereof increases as the absolute value of the steering torque Th increases and as the vehicle speed V decreases. The q-axis current command value calculating unit 71 calculates a compensation value for the basic assist torque using the rotation speed ω of the motor 21 calculated by the rotation speed calculating unit 61 and the steering angle θs calculated by the steering angle calculating unit 62. For example, the compensation value is calculated as a sum of a restoring force to the neutral position of the steering shaft 13, which increases in proportion to the steering angle θs, and a returning torque corresponding to resistance to rotation of the steering shaft 13, which increases in proportion to the rotation speed ω of the motor 21. The q-axis current command value calculating unit 71 sets the sum of the basic assist torque and the compensation value as the target assist torque and calculates a q-axis current command value Iq* in the d-q coordinate system by dividing the target assist torque by a torque constant.

The d-axis current command value calculating unit 72 calculates a d-axis current command value Id* based on the rotation speed ω of the motor 21 calculated by the rotation speed calculating unit 61. The d-axis current command value calculating unit 72 performs field weakening control for setting the d-axis current command value Id* to a negative value based on the rotation speed ω of the motor 21. More specifically, an induced voltage (a counter electromotive force) which is generated in motor coils of the phases increases with an increase of the rotation speed ω of the motor 21, and the rotation speed of the motor 21 has an upper limit (a base speed). However, by setting the d-axis current command value Id* to a negative value, that is, causing a d-axis current to flow in a negative direction, it is possible to decrease magnetic flux in the d-axis direction using a demagnetization magneto-motive force based on a d-axis armature reaction, and to decrease the induced voltage to a low value. As a result, it is possible to extend an operation range (a rotational area) of the motor 21 to a high-speed area which is higher than the base speed.

For example, when the absolute value of the rotation speed ω is equal to or smaller than a first set value which is close to "0," the d-axis current command value calculating unit 72 sets the d-axis current command value Id* to "0." When the absolute value of the rotation speed ω is greater than the first set value, the d-axis current command value calculating unit 72 calculates the d-axis current command value Id* which is a negative value. When the absolute value of the rotation speed ω is greater than the first set value and equal to or smaller than a second set value which is set to be greater than the first set value, the d-axis current command value calculating unit 72 calculates the d-axis current command value Id* such that the absolute value thereof increases as the absolute value of the rotation speed ω increases. When the absolute value of the rotation speed ω is greater than the second set value, the d-axis current command value calculating unit 72 keeps the absolute value of the d-axis current command value Id* at an upper limit value regardless of the rotation speed ω.

The three-phase/two-phase coordinate conversion unit 64 receives the rotation angle m of the motor 21 detected by the rotation angle sensor 43 and the values of the phase currents Iu, Iv, and Iw of the motor 21 detected by the current sensors 54u, 54v, and 54w. The three-phase/two-phase coordinate conversion unit 64 converts the values of the phase currents Iu, Iv, and Iw of three phases of the motor 21 to a q-axis current value Iq and a d-axis current value Id which are two-phase currents in the d-q coordinate system based on the rotation angle Gm of the motor 21.

The feedback control unit 65 receives the q-axis current command value Iq* and the d-axis current command value Id* which are calculated by the current command value calculating unit 63. The feedback control unit 65 also receives the q-axis current value Iq and the d-axis current value Id which are calculated by the three-phase/two-phase coordinate conversion unit 64. The feedback control unit 65 calculates a q-axis current difference which is a difference between the q-axis current command value Iq* and the q-axis current value Iq and a d-axis current difference which is a difference between the d-axis current command value Id* and the d-axis current value Id. The feedback control unit 65 calculates a q-axis voltage command value Vq* such that the q-axis current value Iq matches (i.e., follows) the q-axis current command value Iq*. The feedback control unit 65 calculates a d-axis voltage command value Vd* such that the d-axis current value Id matches (i.e., follows) the d-axis current command value Id*. The feedback control unit 65 calculates the q-axis voltage command value Vq* and the d-axis voltage command value Vd*, for example, by multiplying the q-axis current difference and the d-axis current difference by a predetermined feedback gain.

The two-phase/three-phase coordinate conversion unit 66 receives the q-axis voltage command value Vq* and the d-axis voltage command value Vd* which are calculated by the feedback control unit 65. The two-phase/three-phase coordinate conversion unit 66 converts the q-axis voltage command value Vq* and the d-axis voltage command value Vd* to voltage command values Vu*, Vv*, and Vw* of three phases based on the rotation angle θm of the motor 21 detected by the rotation angle sensor 43.

The control signal generating unit 67 receives the voltage command values Vu*, Vv*, and Vw* of three phases which are calculated by the two-phase/three-phase coordinate conversion unit 66. The control signal generating unit 67 generates motor control signals (PWM control signals) Du, Dv, and Dw with duty ratios corresponding to the voltage command values Vu*, Vv*, and Vw*. By switching the switching elements of the motor drive circuit 52 based on the motor control signals Du, Dv, and Dw, a current corresponding to the target assist torque is supplied to the motor 21.

For example, when the motor 21 rotates at a high speed by the steering wheel 11 being rotationally operated faster, a negative d-axis current flows as a field weakening control current in the motor 21 and thus generation of a counter electromotive force (an induced voltage) in the motor 21 is curbed. Accordingly, even when the steering wheel 11 is operated at a high speed, the motor 21 rotates appropriately in accordance with the high-speed rotation. As a result, it is possible to obtain an excellent steering feeling.

The following events may occur in the electric power steering system 10. Specifically, when a large reverse input load is applied to the turning shaft 15 due to the vehicle running onto a curbstone or the like, so-called end contact in which an end of the turning shaft 15 comes into contact with the housing 16 due to movement of the turning shaft 15 in its axis direction may occur. In this case, the motor 21 also rotates in a direction corresponding to the moving direction of the turning shaft 15 in accordance with the movement of the turning shaft 15.

When a large reverse input load is applied to the turning shaft 15, the turning shaft 15 moves at a very high speed. Accordingly, the motor 21 also rotates at a high speed in proportion to the moving speed of the turning shaft 15. As a result, the d-axis current command value Id* which is calculated by the d-axis current command value calculating unit 72 increases in the negative direction with respect to "0." Accordingly, an increase in the rotation speed of the motor 21 may be promoted. As a result, there is a concern about a further increase in impact load when the turning shaft 15 comes into contact with the housing 16.

Therefore, when the motor 21 rotates at a speed which is not possible in a normal driving operation due to a reverse input via the turning wheels 12, the control device 40 employs the following configuration in order to decrease an impact when end contact has occurred.

As illustrated in FIG. 2, the control device 40 includes a regeneration determining unit 81 and a current sensor 82. The current sensor 82 is provided in a power supply path between the battery 53 and the motor drive circuit 52. The regeneration determining unit 81 determines whether the operating state of the motor 21 is a powering state or a regenerative state based on the direction of a current (a power source current) Ib which is detected by the current sensor 82. The powering state is a normal operating state in which direct-current electric power of the battery 53 is converted to alternating-current electric power by the motor drive circuit 52 and the alternating-current electric power obtained by conversion is supplied to the motor 21. The regenerative state is a state in which electric power generated by the motor 21 with rotation of the motor 21 flows into the battery 53 via the motor drive circuit 52.

The process which is performed by the regeneration determining unit 81 is as illustrated in the flowchart of FIG. 3. The processes of the flowchart are performed in a predetermined control cycle. As illustrated in the flowchart of FIG. 3, the regeneration determining unit 81 determines whether the operating state of the motor 21 is the regenerative state (Step S101).

When the current Ib detected by the current sensor 82 flows from the battery 53 to the motor drive circuit 52, the regeneration determining unit 81 determines that the operating state of the motor 21 is the powering state. When the current Ib detected by the current sensor 82 flows from the motor drive circuit 52 to the battery 53, the regeneration determining unit 81 determines that the operating state of the motor 21 is the regenerative state.

When it is determined that the operating state of the motor 21 is not the regenerative state, the regeneration determining unit 81 generates a state signal Sr indicating the determination result (Step S102) and ends the process flow. When it is determined that the operating state of the motor 21 is the regenerative state, the regeneration determining unit 81 generates a state signal Sr indicating the determination result (Step S102) and ends the process flow.

When the state signal Sr generated by the regeneration determining unit 81 does not indicate that the motor 21 is in the regenerative state, the d-axis current command value calculating unit 72 continues to perform field weakening control for calculating the d-axis current command value Id* based on the rotation speed ω of the motor 21. When the state signal Sr generated by the regeneration determining unit 81 indicates that the motor 21 is in the regenerative state, the d-axis current command value calculating unit 72 stops performing the field weakening control. That is, the d-axis current command value calculating unit 72 sets the d-axis current command value Id* to "0."

In this way, when the motor 21 rotates at a high speed due to, for example, a reverse input via the turning wheels 12, an induced voltage (a counter electromotive force) based on the rotation speed ω at that time is generated in the motor 21 by setting the d-axis current command value Id* to "0." The motor 21 generates a regenerative braking force based on the induced voltage. In addition, as a rotational force transmitted to the motor 21 increases, the generated regenerative braking force increases. An increase of the rotation speed of the motor 21 is curbed by the regenerative braking force. Regenerative resistance (rotational resistance) at the time of electric power generation in the motor 21 serves as a braking force for the turning shaft 15. Accordingly, an increase of an impact load when the turning shaft 15 comes into contact with the housing 16 is curbed.

In addition, when the operating state of the motor 21 changes from the powering state to the regenerative state, the d-axis current command value calculating unit 72 may change the d-axis current command value Id* gradually from a negative predetermined value to "0" at the time of changing the d-axis current command value Id* from the negative predetermined value to "0."

In order to increase the braking force for the turning shaft 15, it is preferable that the regenerative braking force from the motor 21 be larger. However, when the d-axis current command value Id* is instantly changed from the negative predetermined value to "0," high electric power generated with rotation of the motor 21 at a high speed may flow instantly into the motor drive circuit 52 and thus the switching elements of the motor drive circuit 52 may be damaged. Accordingly, when the operating state of the motor 21 changes from the powering state to the regenerative state, it is preferable to gradually change the d-axis current command value Id* from the negative predetermined value to "0." In this case, the induced voltage of the motor 21 changes gradually to a value corresponding to the rotation speed ω. That is, an amount of electric power generated by the motor 21 increases gradually. Thus, it is possible to reduce the possibility that high electric power generated with rotation of the motor 21 at a high speed flows instantly into the motor drive circuit 52. Accordingly, it is possible to curb damage of the switching elements of the motor drive circuit 52.

Advantageous Effects of First Embodiment

As a result, according to the first embodiment, the following advantageous effects can be achieved. (1) When the operating state of the motor 21 is the regenerative state, the d-axis current command value Id* is set to "0." Since the regenerative braking force based on the induced voltage is generated in the motor 21, it is possible to curb an increase of the rotation speed of the motor 21. The regenerative resistance of the motor 21 acts as a braking force for the turning shaft 15. Accordingly, it is possible to curb an increase of an impact load at the time of end contact in which the turning shaft 15 comes into contact with the housing 16 due to a reverse input via the turning wheels 12.

(2) By causing the control device 40 to control the motor 21, an impact load at the time of end contact of the turning shaft 15 due to a reverse input via the turning wheels 12 is decreased. Accordingly, a configuration for securing durability against an impact load at the time of end contact does not need to be separately provided in the electric power steering system 10. Accordingly, it is possible to curb an increase in product cost. It is also possible to secure reliability for durability of the electric power steering system 10.

(3) When the operating state of the motor 21 is the regenerative state, it is possible to reduce the possibility that high electric power generated with rotation of the motor 21 at a high speed flows instantly into the motor drive circuit 52, by gradually changing the d-axis current command value Id* from a negative predetermined value to "0." Accordingly, it is possible to curb damage of the switching elements of the motor drive circuit 52.

Second Embodiment

A steering control device according to a second embodiment will be described below. This embodiment basically employs the same configuration as the first embodiment illustrated in FIGS. 1 and 2. This embodiment is different from the first embodiment in processing details of the control device 40 when the operating state of the motor 21 changes from the powering state to the regenerative state.

As illustrated in the flowchart of FIG. 4, the regeneration determining unit 81 determines whether the operating state of the motor 21 is the regenerative state based on the direction of the current Ib detected by the current sensor 82 (Step S201).

The process flow ends when the regeneration determining unit 81 determines that the operating state of the motor 21 is not the regenerative state (NO in Step S201). The regeneration determining unit 81 calculates a gain G1 based on an amount of electric power generated by the motor 21 (Step S202) when it is determined that the operating state of the motor 21 is the regenerative state (YES in Step S201).

The regeneration determining unit 81 calculates an amount of electric power generated by the motor 21 based on the value of the current Ib detected by the current sensor 82 and calculates the gain G1 by applying the calculated amount of generated electric power to a gain map M1 which is stored in a storage device of the control device 40. The gain map M1 is set such that the induced voltage of the motor 21 does not increase excessively and a predetermined regenerative braking force required of the motor 21 is secured.

Figure 5:
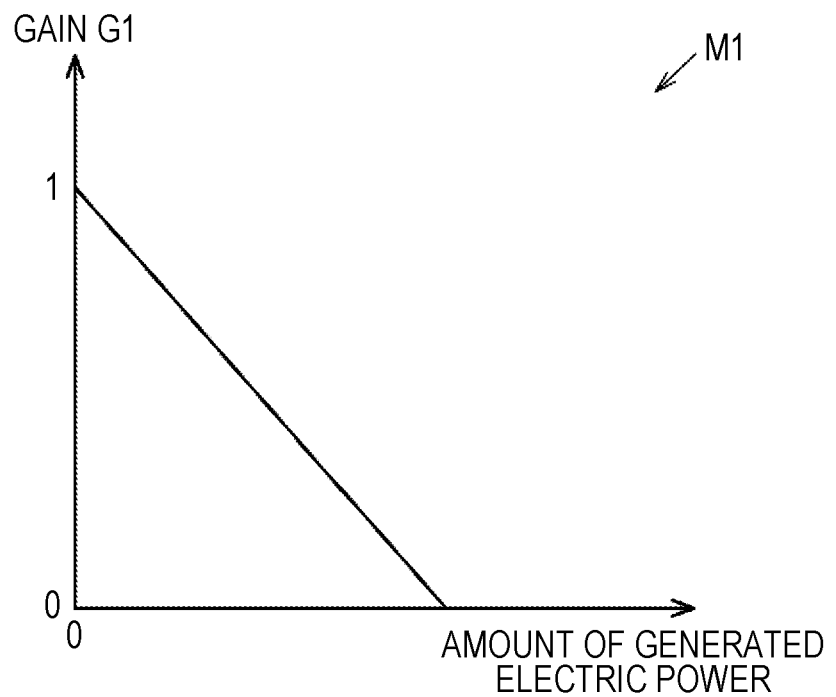
FIG. 5 is a graph illustrating a relationship between an amount of electric power generated by a motor and a gain in the second embodiment.

As illustrated in the graph of FIG. 5, the gain map M1 is a map in which the horizontal axis represents the amount of electric power generated by the motor 21 and the vertical axis represents the gain G1, and has the following characteristics. That is, the value of the gain G1 decreases gradually from "1" to "0" as the amount of electric power generated by the motor 21 increases.

Thereafter, the regeneration determining unit 81 outputs the gain G1 calculated in step S202 as a state signal Sr indicating the operating state of the motor 21 to the d-axis current command value calculating unit 72 (Step S203), and ends the process flow.

The d-axis current command value calculating unit 72 calculates the final d-axis current command value Id* by multiplying the d-axis current command value Id* at the present time by the gain G1 generated by the regeneration determining unit 81. Since the amount of electric power generated by the motor 21 is reflected in the value of the gain G1, the final d-axis current command value Id* is a value that reflects the amount of electric power generated by the motor 21. The gain G1 is set to decrease as the amount of electric power generated by the motor 21 increases. Accordingly, as the amount of electric power generated by the motor 21 becomes greater, the final d-axis current command value Id* becomes smaller than the original d-axis current command value Id* based on the rotation speed ω of the motor 21 by a greater value.

In this way, when the motor 21 rotates at a high speed due to, for example, a reverse input via the turning wheels 12, the d-axis current command value Id* is set based on the amount of electric power generated by the motor 21. As the amount of electric power generated by the motor 21 becomes greater, the final d-axis current command value Id* becomes smaller than the original d-axis current command value Id* based on the rotation speed ω of the motor 21 by a greater value. Accordingly, it is possible to decrease the induced voltage of the motor 21 to a lower value, and accordingly, it is possible to decrease the amount of electric power generated by the motor 21 to a lower value. As a result, it is possible to reduce the possibility that high electric power generated with rotation of the motor 21 at a high speed flows instantly into the motor drive circuit 52. Thus, it is possible to curb damage of the switching elements of the motor drive circuit 52. The regenerative braking force based on the induced voltage of the motor 21 serves as a braking force for the turning shaft 15. As a result, it is possible to curb an increase of an impact load when the turning shaft 15 comes into contact with the housing 16.

Thus, according to the second embodiment, the same advantages as the advantages (1) to (3) in the first embodiment can be achieved. The first and second embodiments may be embodied with the following modifications.

Other Embodiments

The regeneration determining unit 81 may determine the regenerative state of the motor 21 based on the voltage of the battery 53 which is an electric power source. When the motor 21 rotates at a high speed due to, for example, a reverse input via the turning wheels 12, the voltage of the battery 53 increases due to the induced voltage of the motor 21. Accordingly, it is possible to determine the regenerative state of the motor 21 based on the voltage of the battery 53. When this configuration is employed, a voltage sensor that detects the voltage of the battery 53 is provided instead of the current sensor 82 or in addition to the current sensor 82.

The d-axis current command value calculating unit 72 may set the absolute value of the d-axis current command value Id* to a value which is smaller than the original value based on the rotation speed ω of the motor 21 instead of setting the d-axis current command value Id* to "0" when the regeneration determining unit 81 determines that the motor 21 is in the regenerative state.

The d-axis current command value calculating unit 72 may calculate the regenerative braking force from the motor 21 based on the value of the current Ib detected by the current sensor 82 and may adjust the d-axis current command value Id* such that a required regenerative braking force is acquired.

The d-axis current command value calculating unit 72 may adjust the d-axis current command value Id* such that an impact or the moving speed of the turning shaft 15 at the time of end contact of the turning shaft 15 is in a predetermined allowable range.

The d-axis current command value calculating unit 72 may adjust the d-axis current command value Id* such that switching elements of the motor drive circuit 52 are not damaged, based on the value of the current Ib detected by the current sensor 82 or the voltage of the battery 53.

The control device 40 may be applied to an electric power steering system of a type in which an assist force is applied to the steering shaft 13. In this case, as indicated by an alternate long and two short dashes line in FIG. 1, the motor 21 is connected to the steering shaft 13 via a transmission mechanism such as a worm reducer.

The control device 40 can also be applied as a control device for a steer-by-wire system (and the control device 40 can also be applied as a control device for an automated driving system) in which transmission of power between the steering wheel 11 and the turning wheels 12 and 12 is separated. The control device 40 can be suitably used as a control device for an actuator such as a steering motor that generates power for turning the turning wheels 12 and 12.

What is claimed is:

1. A steering control device comprising
an electronic control unit configured to calculate a d-axis current command value and a q-axis current command value in a d-q coordinate system as current command values for a motor having three phases configured to generate drive power applied to a shaft that is interlocked with turning wheels, to convert detected current values in the phases of the motor to a d-axis current detected value and a q-axis current detected value in the d-q coordinate system, and to perform feedback control such that the d-axis current detected value and the q-axis current detected value that are obtained by conversion match the d-axis current command value and the q-axis current command value, respectively,
wherein the electronic control unit is configured to perform field weakening control for setting the d-axis current command value to a negative value based on a rotation speed of the motor, to determine whether the motor is in a regenerative state, and to calculate the d-axis current command value according to the regenerative state of the motor when the electronic control unit determines that the motor is in the regenerative state, and
wherein the electronic control unit is configured to set the d-axis current command value to zero when the electronic control unit determines that the motor is in the regenerative state.

2. The steering control device according to claim 1, wherein the electronic control unit is configured to set an absolute value of the d-axis current command value to a value that is smaller than an original value based on the rotation speed of the motor when the electronic control unit determines that the motor is in the regenerative state.

3. The steering control device according to claim 1, wherein the electronic control unit is configured to set an absolute value of the d-axis current command value such that the absolute value of the d-axis current command value decreases as an amount of electric power generated by the motor increases when the electronic control unit determines that the motor is in the regenerative state.

4. The steering control device according to claim 2, wherein the electronic control unit is configured to change the d-axis current command value when the electronic control unit determines that the motor is in the regenerative state.

5. The steering control device according to claim 1, wherein the electronic control unit is configured to determine the regenerative state of the motor based on a direction of a power source current or a power source voltage.

6. A steering control device comprising
an electronic control unit configured to calculate a d-axis current command value and a q-axis current command value in a d-q coordinate system as current command values for a motor having three phases configured to generate drive power applied to a shaft that is interlocked with turning wheels, to convert detected current values in the phases of the motor to a d-axis current detected value and a q-axis current detected value in the d-q coordinate system, and to perform feedback control such that the d-axis current detected value and the q-axis current detected value that are obtained by conversion match the d-axis current command value and the q-axis current command value, respectively,
wherein the electronic control unit is configured to perform field weakening control for setting the d-axis current command value to a negative value based on a rotation speed of the motor, to determine whether the motor is in a regenerative state, and to calculate the d-axis current command value according to the regenerative state of the motor when the electronic control unit determines that the motor is in the regenerative state, and wherein the electronic control unit is configured to set an absolute value of the d-axis current command value such that the absolute value of the d-axis current command value decreases as an amount of electric power generated by the motor increases when the electronic control unit determines that the motor is in the regenerative state.

* * * * *